United States Patent
Mori et al.

(10) Patent No.: US 8,728,392 B2
(45) Date of Patent: May 20, 2014

(54) METHOD OF USING AN AMINE COMPOUND AS ANTICORROSIVE FOR A BOILER

(71) Applicants: Shintarou Mori, Tokyo (JP); Yukimasa Shimura, Tokyo (JP)

(72) Inventors: Shintarou Mori, Tokyo (JP); Yukimasa Shimura, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 14/025,340

(22) Filed: Sep. 12, 2013

(65) Prior Publication Data

US 2014/0017120 A1    Jan. 16, 2014

Related U.S. Application Data

(63) Continuation of application No. 13/810,332, filed as application No. PCT/JP2011/064270 on Jun. 22, 2011.

(30) Foreign Application Priority Data

Jul. 16, 2010 (JP) .................... 2010-162081

(51) Int. Cl.
*C23F 11/14* (2006.01)
*C23F 11/167* (2006.01)
*C09K 15/02* (2006.01)
*C09K 15/08* (2006.01)
*C09K 15/18* (2006.01)

(52) U.S. Cl.
USPC ............ 422/16; 422/7; 252/390; 252/392; 252/401; 252/402

(58) Field of Classification Search
USPC ............ 252/390, 392, 401, 402; 422/7, 16; 564/508
See application file for complete search history.

(56) References Cited

U.S. PATENT DOCUMENTS

| | | | |
|---|---|---|---|
| 3,372,009 A | 3/1968 | Waldmann | |
| 3,976,593 A * | 8/1976 | Hartke et al. | 252/391 |
| 4,192,844 A | 3/1980 | Trace et al. | |
| 4,569,783 A | 2/1986 | Muccitelli | |
| 4,681,737 A * | 7/1987 | Walker et al. | 422/16 |
| 4,895,703 A * | 1/1990 | Zupanovich et al. | 422/14 |
| 5,876,623 A * | 3/1999 | Tang et al. | 252/180 |
| 6,117,795 A * | 9/2000 | Pasch | 438/745 |
| 2001/0004633 A1 * | 6/2001 | Naghshineh et al. | 510/175 |
| 2001/0030315 A1 * | 10/2001 | Aoki et al. | 252/390 |
| 2002/0100896 A1 | 8/2002 | Koizumi et al. | |
| 2002/0168422 A1 * | 11/2002 | Hei et al. | 424/661 |
| 2003/0186175 A1 * | 10/2003 | Ikemoto et al. | 430/331 |
| 2004/0259761 A1 * | 12/2004 | Yokoi et al. | 510/504 |
| 2005/0032664 A1 * | 2/2005 | Gichuhi et al. | 510/402 |
| 2006/0000356 A1 * | 1/2006 | Tomoe et al. | 95/236 |
| 2006/0207969 A1 * | 9/2006 | Sugimoto et al. | 216/58 |
| 2007/0169791 A1 * | 7/2007 | Han et al. | 134/2 |
| 2009/0151318 A1 * | 6/2009 | Handagama et al. | 60/39.182 |
| 2013/0140493 A1 * | 6/2013 | Mori et al. | 252/392 |

FOREIGN PATENT DOCUMENTS

| | | |
|---|---|---|
| KR | 100342269 B1 | 6/2002 |
| WO | 2008/006855 A2 | 1/2008 |
| WO | 2009/076575 A2 | 6/2009 |

OTHER PUBLICATIONS

Europe Patent Office, "Extended European Search Report for EP 11806604.2," Nov. 28, 2013.
Intellectual Property Office of Singapore, "Search Report and Written Opinion for Singapore Patent Application No. 201300360-3," Jan. 2, 2014.

* cited by examiner

*Primary Examiner* — Joseph D Anthony
(74) *Attorney, Agent, or Firm* — Manabu Kanesaka

(57) ABSTRACT

The method of using an amine compound represented by the formula $NH_2—(CH_2)_m—O—(CH_2)_n—OH$, where each of m and n is an integer of 1 to 3, as a boiler anti-corrosive.

10 Claims, No Drawings

METHOD OF USING AN AMINE COMPOUND AS ANTICORROSIVE FOR A BOILER

TECHNICAL FIELD

The present invention relates to a method of using an amine compound as an anti-corrosive for a boiler (hereinafter referred to as a "boiler anti-corrosive") and, more particularly, to a boiler anti-corrosive suitably used in a boiler operated with a superheater and a steam turbine.

BACKGROUND ART

Boilers have a structure for heating boiler water to generate vapor, and an anti-corrosive is applied to such boilers for preventing corrosion of metal members of the boilers. Particularly, in boilers for power generation, garbage incineration, etc., operated with a superheater or a steam turbine, ion-exchange water or desalinated water is generally used as a supplementary feed. Such boilers are generally operated at a concentration factor of about 30 to about 100, which is one of the water quality control factors. In such boilers, a phosphate salt, instead of a caustic alkali substance, is added so as to adjust the pH of boiler water for corrosion prevention, and a neutralizable amine or ammonia is added so as to elevate the pH of the boiler feed-condensate system, to thereby prevent elution of iron, whereby the amount of iron transferred into a boiler tank is reduced.

In recent years, however, the amounts of organic substances unintentionally transferred to a boiler tank have increased due to use of various water sources and impaired water quality. In addition, the blow rate has been reduced for the purpose of saving energy and water, and an organic oxygen scavenger is used instead of hydrazine. Under such circumstances, the pH of boiler water often lowers problematically. In order to solve the problem, the phosphate salt level of the boiler water is increased, or a phosphate salt-type boiler compounds (a sodium phosphate-sodium hydroxide mixture) having an $Na/PO_4$ mole ratio of 3 or higher is used. In the above case, a phosphate salt hide-out phenomenon or alkali corrosion may problematically occur. The term "phosphate salt hide-out phenomenon" refers to deposition of the phosphate salt dissolved in boiler water caused by a rapid change in concentration or pressure. The hide-out phenomenon adversely affects a boiler member, and an example thereof is impairment of thermal conduction.

Some known anti-corrosives typically employed in the above boiler feed-condensate system include 2-aminoethanol (MEA) and monoisopropanolamine (MIPA). However, these compounds cannot fully elevate the pH of boiler water.

As an alternative to these compounds, Patent Document 1 discloses a boiler anti-corrosive containing methyldiethanolamine (MDEA). More specifically, Patent Document 1 discloses that the pH can be readily elevated by use of MDEA under high-temperature corrosive circumstances; that MDEA has low volatility to generate a less amount of vapor thereof, thereby less affecting the reaction system; and MDEA enhances the deoxygenation performance of an optionally employed oxygen scavenger, thereby realizing high anti-corrosive performance by addition thereof in a small amount.

PRIOR ART DOCUMENTS

Patent Documents

Patent Document 1: Japanese Patent Application Laid-Open (kokai) No. 2003-231980

SUMMARY OF THE INVENTION

Problems to be Solved by the Invention

However, the anti-corrosive containing MDEA disclosed in Patent Document 1 has a drawback that it must be added in a large amount to feed water. Thus, there is demand for an anti-corrosive which exhibits anti-corrosive performance even through addition thereof in a small amount.

The present invention has been conceived for solving the aforementioned problems, and an object of the invention is to provide an anti-corrosive which can more effectively maintain the pH of boiler water and which can prevent corrosion of a boiler tank and the entire boiler system including a feed-condensate system, without adding a large amount of phosphate salt or elevating the $Na/PO_4$ mole ratio to 3 or higher.

Means for Solving the Problems

The present inventors have conducted extensive studies in order to attain the aforementioned object, and have found that the object can be attained by a chemical agent containing an amine compound having a specific structure including an amino group and a hydroxyl group in the molecule thereof, in particular, a chemical agent containing an oxygen scavenger and the agent containing the amine compound. The present invention has been accomplished on the basis of this finding.

Accordingly, the present invention provides the following [1] to [6].

[1] A boiler anti-corrosive characterized by containing an amine compound represented by formula (1):

$$NH_2-(CH_2)_m-O-(CH_2)_n-OH \qquad (1)$$

(wherein each of m and n is an integer of 1 to 3) (hereafter may be referred to as an "anti-corrosive I").

[2] A boiler anti-corrosive as described in [1] above, which further contains an oxygen scavenger (hereafter may be referred to as an "anti-corrosive II").

[3] A boiler anti-corrosive as described in [2] above, wherein the oxygen scavenger is at least one species selected from among hydrazine, carbohydrazide, hydroquinone, 1-aminopyrrolidine, 1-amino-4-methylpiperazine, N,N-diethylhydroxylamine, isopropylhydroxylamine, erythorbic acid and a salt thereof, and ascorbic acid and a salt thereof.

[4] A boiler anti-corrosive as described in any of [1] to [3] above, wherein the amine compound represented by formula (1) is at least one species selected from 2-(2-aminoethoxy)ethanol and 3-(3-aminopropoxy)propanol.

[5] A boiler anti-corrosive as described in any of [1] to [4] above, which further contains a neutralizable amine and/or ammonia.

[6] A boiler anti-corrosive as described in [5] above, wherein the neutralizable amine is 3-methoxypropylamine.

Effects of the Invention

The present invention enables provision of an anti-corrosive which can more effectively maintain the pH of boiler water and which can prevent corrosion of a boiler tank and the entire boiler system including a feed-condensate system, without adding a large amount of phosphate salt or elevating the $Na/PO_4$ mole ratio to 3 or higher, the anti-corrosive being generally for use in a boiler operated with a superheater or a steam turbine, such a boiler to which treated water is fed, etc.

Modes for Carrying Out the Invention

The modes of the boiler anti-corrosive of the present invention are (i) anti-corrosive I containing an amine compound represented by formula (1):

$$NH_2-(CH_2)_m-O-(CH_2)_n-OH \quad (1)$$

(wherein each of m and n is an integer of 1 to 3), and (ii) anti-corrosive II which further contains an oxygen scavenger.

[Anti-Corrosive I]

The boiler anti-corrosive I of the present invention contains the aforementioned amine compound represented by formula (1). The amine compound is a low-volatility amine which has high thermal stability and high dissociation degree. Thus, the amine remains in boiler water rather than moving to the vapor phase, whereby the pH of boiler water can be effectively maintained.

Therefore, the amine compound itself can serve as an anti-corrosive and may also be used in combination with another volatile amine, such as an amine having a volatility higher than that of the aforementioned amine compound. In the latter case, the amount of amine transferred to the vapor generated in the boiler can be controlled, along with the pH of feed water and concentrated water, to thereby prevent corrosion of the entire boiler system.

The amine compound is preferably 2-(2-aminoethoxy) ethanol, in which each of m and n in formula (1) is 2, 3-(3-aminopropoxy)ethanol, in which m is 3 and n is 2, or 3-(3-aminopropoxy)propanol, in which each of m and n is 3, from the viewpoint of anti-corrosion performance. Among them, 2-(2-aminoethoxy)ethanol is more preferred.

The anti-corrosive I may consist of the amine compound as a sole ingredient, or may be a combined agent further containing water, another solvent, and an optional ingredient. When the combined agent is used, these ingredients may be individually and separately supplied to a boiler, followed by mixing. Alternatively, the ingredients may be combined to provide a pre-mix type agent, which is added to a boiler.

[Anti-Corrosive II]

The boiler anti-corrosive II of the present invention contains an oxygen scavenger and the amine compound represented by formula (1). As described above in the "anti-corrosive I," the amine compound is preferably 2-(2-aminoethoxy) ethanol or 3-(3-aminopropoxy)ethanol, with 2-(2-aminoethoxy)ethanol being more preferred.

The anti-corrosive II may consist of an oxygen scavenger and the amine compound, or may be a combined agent further containing water, another solvent, and an optional ingredient.

(Oxygen Scavenger)

No particular limitation is imposed on the oxygen scavenger, and known oxygen scavenger may be used. The oxygen scavenger is preferably at least one species selected from among hydrazine, carbohydrazide, hydroquinone, 1-aminopyrrolidine, 1-amino-4-methylpiperazine, N,N-diethylhydroxylamine, isopropylhydroxylamine, erythorbic acid and a salt thereof, and ascorbic acid and a salt thereof. Among them, 1-amino-4-methylpiperazine (hereinafter may be referred to as "1A4MP") is more preferred.

When used in combination with a non-hydrazine type organic oxygen scavenger, the oxygen scavenger may be used in a sufficient amount without lowering the pH of boiler water, whereby contamination with organic matter can be prevented, and the concentration factor of the boiler can be elevated. The amount of oxygen scavenger is adjusted in response to the dissolved oxygen level of the feed water. If a degassing apparatus is employed, the oxygen scavenger is added in an amount depending on the performance of the degassing apparatus.

In the anti-corrosive II, the amine compound concentration is tuned so as to adjusting the pH of boiler water to a predetermined level, generally pH of 8.5 to 10.8, depending on the pressure. The oxygen scavenger concentration is tuned so as to sufficiently remove dissolved oxygen in feed water having the above pH.

Specifically, the amine compound level is preferably 0.1 to 99.9 mass %, more preferably 0.5 to 99 mass %, still more preferably 1 to 97 mass %, and the oxygen scavenger level is preferably 99.9 to 0.1 mass %, more preferably 99.5 to 1 mass %, still more preferably 99 to 3 mass %.

When the anti-corrosive II of the present invention is used, the oxygen scavenger and the amine compound may be individually and separately supplied to a boiler, followed by mixing. Alternatively, the two ingredients may be combined to provide a pre-mix type agent, which is added to a boiler.

(Other Ingredients Incorporated into Anti-Corrosives I and II)

In the anti-corrosives I and II of the present invention, the amount of amine compound supplied to feed water is preferably 0.01 to 100 mg/L, more preferably 0.05 to 50 mg/L, still more preferably 0.1 to 10 mg/L. In order to prevent corrosion of the water feed system, the anti-corrosives may further contain at least one species selected from ammonia and a neutralizable amine.

<Neutralizable Amine>

A neutralizable amine volatiles with steam generated in the boiler, and is dissolved in feed water when the steam is condensed. The neutralizable amine neutralizes carbon dioxide contained in feed water, to thereby elevate the pH of the condensed water, whereby corrosion of steel members of the boiler is inhibited. The effect of ammonia is the same as that of the neutralizable amine.

Examples of preferred neutralizable amines include monoethanolamine (MEA), cyclohexylamine (CHA), morpholine (MOR), diethylethanolamine (DEEA), monoisopropanolamine (MIPA), 3-methoxypropylamine (MOPA), and 2-amino-2-methyl-1-propanol (AMP). Of these, 3-methoxypropylamine (MOPA) is more preferred.

The ratio of [neutralizable amine and/or ammonia] to the amine compound; i.e., [amine compound:neutralizable amine and/or ammonia] (ratio by mass) is preferably 0.01:100 to 100:0.01, more preferably 0.01:10 to 10:0.01, still more preferably 0.1:10 to 10:0.1.

<Phosphate Salts and Other Ingredients>

The anti-corrosives I and II of the present invention may contain a phosphate salt which is generally used for adjusting the pH of boiler water. Examples of the optionally employed phosphate salt include trisodium phosphate, disodium phosphate, a mixture of trisodium phosphate and disodium phosphate at a specific ratio, sodium metaphosphate, sodium pyrophosphate, sodium tripolyphosphate, and a mixture of sodium hexametaphosphate and sodium hydroxide having a specific $Na/PO_4$ mole ratio. In the case where a caustic alkali is allowed to be used under low boiler water pressure, NaOH or KOH may be used in combination. Furthermore, another anti-corrosive, a film-forming anti-corrosive which prevents corrosion by forming a dense film on metal surfaces, such as octadecylamine, a stabilizer, and other additives may be also used in combination. These additional ingredients may be mixed with the amine compound or individually added.

The amounts of phosphate salt and other ingredients may be appropriately predetermined to attain the effects thereof. The solvent is preferably an aqueous medium, and the solvent content of the anti-corrosive of the invention may also be predetermined appropriately. Needless to say, no solvent may be used, or the solvent may be contained in such an amount that it can be absorbed by the hygroscopic property of the chemical agent.

No particular limitation is imposed on the boiler to which the anti-corrosive (I) or (II) of the present invention is applied. Examples of particularly preferred boilers include (i) a boiler operated with a superheater or a steam turbine and (ii) a boiler which is operated with a superheater or a steam turbine and to which treated water is fed.

Through addition of the anti-corrosive (I) or (II) of the present invention to the water feed system, the neutralizable amine elevates the pH of feed water to a specific value, and the oxygen scavenger removes dissolved oxygen from feed water, whereby the level of iron eluted from the water feed line and transferred into the boiler can be reduced. The amine compound transferred to the boiler with feed water can elevate the pH of boiler water to a specific level, to thereby prevent corrosion of the boiler tank. A part of the amine compound and the optionally used neutralizable amine move to steam, to thereby elevate the pH of condensate, whereby corrosion of the condensate system is prevented. In addition, the levels of iron and copper transferred from the condensate serving as feed water to the boiler can be reduced.

EXAMPLES

The present invention will next be described in more detail by way of examples, which should not be construed as limiting the invention thereto.

In the Examples, compound (A) was 2-(2-aminoethoxy)ethanol represented by the following formula (A), and compound (B) was 3-(3-aminopropoxy)propanol represented by the following formula (B).

$$NH_2-(CH_2)_2-O-(CH_2)_2-OH \quad (A)$$

$$NH_2-(CH_2)_3-O-(CH_2)_3-OH \quad (B)$$

Experiment 1

A corrosion test was carried out through employment of a test boiler which was operated under the following conditions: a pressure of 4 MPa, a blow rate of 1%, a condensate recovery of 20%, pure water (ion-exchange water) feed, and use of a heater-degasser [outlet degassing capacity (dissolved oxygen level: DO) of 0.03 mg/L]. In the corrosion test, to feed water, sodium phosphate having an $Na/PO_4$ mole ratio of 2.7 was added in an amount of 0.1 mg/L as phosphate ion, and monoisopropanolamine (MIPA) was added in an amount of 1.5 mg/L. As a result, the pH of boiler water was 10.0.

When a microamount of organic matter originating from feed water is thermally decomposed in boiler water, an organic acid is conceivably formed. Thus, 0.06 mg/L of acetic acid was added to feed water as the organic acid. In this case, the pH (25° C.) of boiler water was lowered to 9.2, lower than 9.4, which the lower limit of JIS standard value under such a pressure (Comparative Example 1). Then, MIPA was changed to methyldiethanolamine (MDEA) 1.5 mg/L, which was the same agent concentration. In this case, the pH (25° C.) of boiler water remained at 9.2 (Comparative Example 2). When MDEA was changed to the compound (A), the pH (25° C.) of boiler water was elevated to 9.4, which is equal to or higher than the JIS standard value of the pH of boiler water (Example 1). Table 1 shows the results.

As is clear from Table 1, the compound (A) was found to readily elevate the pH of boiler water even at the same amount of addition.

TABLE 1

| | Comp. Ex. 1 | Comp. Ex. 2 | Ex. 1 |
|---|---|---|---|
| Added ingredient | MIPA | MDEA | Compound (A) |
| pH of boiler water | 9.2 | 9.2 | 9.4 |

Experiment 2

To a test boiler, pure water (ion-exchange water) having a dissolved oxygen concentration of 0.010 mg/L after degassing was fed. The boiler was operated at a pressure of 11 MPa and a blow rate of 1%, without recovering condensate. In the Comparative Examples, the boiler was operated while each of monoethanolamine (MEA), MIPA, MDEA, and 3-methoxypropylamine (MOPA) was added in an amount of 1.5 mg/L. When the pH of boiler water was stabilized, measurement was performed (Comparative Examples 3 to 6). In the Examples, the boiler was operated while the compound (A) or (B) was added in an amount of 1.5 mg/L. When the pH of boiler water was stabilized, measurement was performed (Examples 2 and 3). Table 2 shows the results.

As is clear from Table 2, in Examples 2 and 3, in which compounds (A) and (B) were added, a higher pH elevating effect was attained, as compared with Comparative Examples 3 to 6.

TABLE 2

| | Comp. Ex. 3 | Comp. Ex. 4 | Comp. Ex. 5 | Comp. Ex. 6 | Ex. 2 | Ex. 3 |
|---|---|---|---|---|---|---|
| Added ingredient | MEA | MIPA | MDEA | MOPA | Compd. (A) | Compd. (B) |
| pH of boiler water | 9.3 | 9.1 | 9.2 | 9.0 | 9.5 | 9.4 |

Experiment 3

A corrosion test was carried out through employment of a test boiler which was operated under the following conditions: a pressure of 11 MPa, a blow rate of 1%, a condensate recovery of 30%, pure water (ion-exchange water) feed, and use of a heater-degasser [outlet degassing capacity (DO value) of 0.01 mg/L]. In the corrosion test, sodium phosphate having an $Na/PO_4$ mole ratio of 2.7 was added in an amount of 0.01 mg/L, as phosphate ion, to feed water. The other test conditions are shown in Table 2. During the test period of one week, the boiler was operated for 5 days and stopped for 2 days. The procedure was repeated. That is, the test was performed for 14 days. By the above test, the iron level of the feed water (average) (mg/L), the amount of iron deposited on the thermal conduction surface (mg $Fe/cm^2$), and the corrosion rate (mdd) of a steel test piece placed in the test boiler were evaluated.

In the Comparative Examples, MOPA as a single ingredient, MOPA and an oxygen scavenger 1-amino-4-methylpiperazine (1A4MP), MIPA as a single ingredient, and or MIPA and 1A4MP were added, and a corrosion test was performed by use of each agent (Comparative Examples 7 to 10). In the Examples, the compound (A) and 1A4MP; the compound (A), MOPA, and 1A4MP; and the compound (A), MOPA, 1A4MP, and an oxygen scavenger diethylhydroxylamine (DEHA) were added, and a corrosion test was performed by use of each agent. Table 3 shows the results.

In Table 3, the unit mdd of the corrosion rate of a test piece is based on the daily amount of corrosion (mg) for an area of 100 cm².

TABLE 3

| | Test conditions | Fe level of feed water (mg/L) | Amount of Fe deposited on thermal conduction surface (mg Fe/cm²) | Test piece corrosion rate (mdd) |
|---|---|---|---|---|
| Comp. Ex. 7 | MOPA (1.0 mg/L) | 0.04 | 0.61 | 6.2 |
| Comp. Ex. 8 | MOPA (1.0 mg/L) 1A4MP (0.08 mg/L) | <0.03 | 0.55 | 3.2 |
| Comp. Ex. 9 | MIPA (1.0 mg/L) | 0.06 | 0.69 | 8.7 |
| Comp. Ex. 10 | MIPA (1.0 mg/L) 1A4MP (0.08 mg/L) | <0.03 | 0.60 | 5.1 |
| Ex. 4 | Compd. (A) (1.0 mg/L) 1A4MP (0.08 mg/L) | <0.03 | 0.42 | 1.3 |
| Ex. 5 | Compd. (A) (0.5 mg/L) MOPA (0.5 mg/L) 1A4MP (0.08 mg/L) | <0.03 | 0.35 | 1.6 |
| Ex. 6 | Compd. (A) (0.5 mg/L) MOPA (0.5 mg/L) 1A4MP (0.04 mg/L) DEHA (0.04 mg/L) | <0.03 | 0.37 | 1.7 |

The following was confirmed from Table 3.

The iron concentration of feed water was in excess of the JIS standard feed water iron concentration; i.e., 0.03 mg/L, when only MOPA (Comparative Example 7) or only MIPA (Comparative Example 9) was added. In the other cases, the iron concentration of feed water was lower than the JIS standard iron concentration.

Next, the corrosion rate of the test piece was lower in Examples 4 to 6, in which the compound (A)[2-(2-aminoethoxy)ethanol] was used, than in Comparative Examples 7 to 10. The amount of iron deposited on the thermal conduction surface is smaller in Examples 4 to 6 than in Comparative Examples 7 to 10.

Therefore, according to the present invention, the amount of iron in feed water including iron eluted from condensate was reduced, and deposition of scale, which is a corrosion product, on the thermal conduction surface, and corrosion of a boiler tank were favorably prevented.

INDUSTRIAL APPLICABILITY

Generally, the anti-corrosive of the present invention can be preferably employed in a boiler operated with a superheater and a steam turbine, such a boiler to which treated water is fed, etc.

The invention claimed is:

1. A method of using an amine compound represented by formula (1), comprising:
   adding 0.01 to 100 mg/L of $NH_2-(CH_2)_m-O-(CH_2)_n-OH$ ... (1), where each of m and n is an integer of 1 to 3, as a boiler anti-corrosive to a water in a boiler.

2. The method according to claim 1, wherein the method further comprises adding an oxygen scavenger.

3. The method according to claim 2, wherein the oxygen scavenger is at least one selected from the group consisting of hydrazine, carbohydrazide, hydroquinone, 1-aminopyrrolidine, 1-amino-4-methylpiperazine, N,N-diethylhydroxylamine, isopropylhydroxylamine, erythorbic acid and a salt thereof, and ascorbic acid and a salt thereof.

4. The method according to claim 1, wherein the amine compound represented by formula (1) is at least one selected from the group consisting of 2-(2-aminoethoxy)ethanol and 3-(3-aminopropoxy)propanol.

5. The method according to claim 1, wherein the method further comprises adding at least one selected from the group consisting of ammonia and a neutralizable amine.

6. The method according to claim 5, wherein the neutralizable amine is 3-methoxypropylamine.

7. The method according to claim 1, wherein the method further comprises adding phosphate salt.

8. A method of preventing corrosion of a boiler tank, comprising:
   adding, to a water feed system of the boiler tank, 0.01 to 100 mg/L of an amine compound represented by formula (1)

$$NH_2-(CH_2)_m-O-(CH_2)_n-OH \qquad (1),$$

where each of m and n is an integer of 1 to 3, as a boiler anti-corrosive.

9. The method according to claim 8, wherein the method further comprises adding an oxygen scavenger.

10. The method according to claim 8, wherein the method further comprises adding phosphate salt.

* * * * *